United States Patent
Yabu et al.

(10) Patent No.: US 7,794,838 B2
(45) Date of Patent: Sep. 14, 2010

(54) NANODISK COMPRISING BLOCK COPOLYMER

(75) Inventors: Hiroshi Yabu, Miyagi (JP); Takeshi Higuchi, Sapporo (JP); Masatsugu Shimomura, Miyagi (JP)

(73) Assignee: National University Corporation Hokkaido University, Hokkaido (JP)

( * ) Notice: Subject to any disclaimer, the term of this patent is extended or adjusted under 35 U.S.C. 154(b) by 0 days.

(21) Appl. No.: 12/223,554

(22) PCT Filed: Feb. 2, 2007

(86) PCT No.: PCT/JP2007/051760

§ 371 (c)(1),
(2), (4) Date: Jul. 31, 2008

(87) PCT Pub. No.: WO2007/088957

PCT Pub. Date: Aug. 9, 2007

(65) Prior Publication Data

US 2009/0136756 A1 May 28, 2009

(30) Foreign Application Priority Data

Feb. 3, 2006 (JP) .............................. 2006-026944

(51) Int. Cl.
| | |
|---|---|
| B82B 1/00 | (2006.01) |
| B82B 3/00 | (2006.01) |
| C08F 293/00 | (2006.01) |
| C08J 3/14 | (2006.01) |
| C08G 59/00 | (2006.01) |
| C08G 63/08 | (2006.01) |
| C08G 63/91 | (2006.01) |
| C08L 53/00 | (2006.01) |
| C08L 83/10 | (2006.01) |

(52) U.S. Cl. .................. 428/407; 428/402; 428/403; 525/50; 525/94; 525/95; 525/415; 525/418; 525/474; 525/523; 977/773; 977/897

(58) Field of Classification Search ........... 428/694 ST, 428/402, 403, 407; 525/50, 94, 95, 415, 525/418, 474, 523; 977/773, 897
See application file for complete search history.

(56) References Cited

U.S. PATENT DOCUMENTS 7,531,121 B2 * 5/2009 Nakano et al. .............. 264/322

FOREIGN PATENT DOCUMENTS

| JP | 2002-347107 | 12/2002 |
|---|---|---|
| JP | 2004-067883 | 3/2004 |

OTHER PUBLICATIONS

H. Yabu et al., Unique phase-separation structures of block-copolymer nanoparticles, Advanced Materials, 2005, 17, 20062-20065.*
Yabu et al., Advanced Materials, 17:2062-2065 (2005).

* cited by examiner

Primary Examiner—D. S Nakarani
(74) Attorney, Agent, or Firm—Peter F. Corless; Christine C. O'Day; Edwards Angell Palmer & Dodge LLP

(57) ABSTRACT

This invention provides a nanodisk, which can be formed of a wide variety of materials and has a high level of application, and a method for manufacturing the same. The nanodisk comprises fundamental units formed of two-molecule block copolymers arranged in series in a main chain direction, the fundamental units having been aggregated in a plane direction. The nanodisk has a thickness of 1 nm to 100 nm, a diameter of 10 nm to 5 μm, and an aspect ratio of not less than 1. Since the thickness of the nanodisk is not more than 100 nm, the nanodisk is transparent to light in a visible region. Further, when a metal element is held on the crosslinked structure part, the nanodisk can be utilized as a nanodisk having magnetic properties and electroconductive properties, or a nanodisk having catalytic activity and a high refractive index. Thus, the nanodisk can be applied to a wide variety of fields such as fine particle/powder technology, colloid surface science, electronic materials, and optical materials.

10 Claims, 5 Drawing Sheets

NANODISK COMPRISING BLOCK COPOLYMER

TECHNICAL FIELD

The present invention relates to a nanodisk comprising a block copolymer, and a method for producing the same.

BACKGROUND ART

In the technical field called nanotechnology, application of nanometer scale fine particles (nanoparticles) in a variety of technical fields such as, for example, electronic materials, optical materials, catalysts, biotechnology, medicine, and optical crystals has attracted more attention in these several years.

Most of the conventional productions of nanoparticles, and particularly nanoparticles comprising organic polymers, are based on the method of forming fine particles by emulsifying or dispersing an appropriate polymer in an organic solvent. In this method based on dispersing of a polymer in a liquid, the shape of the fine particles in general necessarily becomes spherical, and thus non-spherical, particularly flat plate-shaped nanoparticles, that is, nanodisks, cannot be easily produced simply by dispersing a polymer in a solvent.

Flat plate-shaped nanoparticles are attracting attention mainly in the field of photographic emulsions. However, such fine particles are all flat plate-shaped particles having silver halide, particularly silver chloride, and the constituent components and the uses are limited (for example, Patent Document 1 and Patent Document 2).

Patent Document 3 also discloses a planiform plate-shaped organic filler using a thermoplastic resin and a method for producing the same. This method requires complicated processes such as repeatedly laminating a laminate in which at least two layers of a layer containing a thermoplastic resin and a layer containing a thermoplastic resin having a lower melting point compared to the former thermoplastic resin are laminated to form an ultra-multilayer laminate (Patent Document 3).

Patent Document 1: JP-A No. 2000-56419 (P2000-56419A)
Patent Document 2: JP-A No. 10-319528
Patent Document 3: JP-A No. 11-199706

DISCLOSURE OF THE INVENTION

Problems to be Solved by the Invention

The present invention is to provide a nanodisk which is made of a wide variety of materials and has high applicability, without the use being limited to photographic emulsions or the like, and a method for producing the same.

Means for Solving the Problems

The inventors of the present invention discovered that it is possible to form a nanodisk based on the polymer fine particles which have a phase-separated structure comprising microregions of two or more types with different natures as disclosed in Japanese Patent Application No. 2004-260844, by detaching the phase structure of the fine particles, thus completing each of the following inventions.

(1) A nanodisk comprising basic units aggregated in a planar direction, and having a thickness of 1 nm to 100 nm, a diameter of 10 nm to 5 µm, and an aspect ratio of 1 or greater, with the basic unit being formed of two molecules of a block copolymer arranged in series in the main chain direction.

(2) The nanodisk according to (1), having a structure represented by the following formula (I):

[Chemical Formula 1]

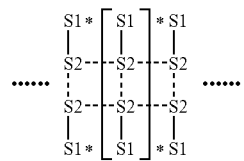

(I)

wherein ( ) represents a basic unit comprising two molecules of a block copolymer, S1-S2, arranged in series in the main chain direction; S1 represents one block or a set of two or more blocks; S2 represents a block different from S1; . . . represents a van der Waals bond between blocks;— represents a covalent bond; . . . indicates repetition; * indicates that a van der Waals bond may be present at that position; the difference between solubility parameters of S1 and S2 is 2 or greater; and S2/(S1+S2) is 0.3 to 0.8.

(3) The nanodisk according to (2), wherein S1 is one block or two or more blocks composed of monomer units selected from the group consisting of methyl methacrylate, methacrylic acid, acrylic acid, styrenesulfonic acid, N-isopropylacrylamide, acrylamide, vinylpyridine and polymerizable derivatives of these compounds, and S2 is a block composed of a monomer unit selected from the group consisting of styrene, isoprene, butadiene, bisphenol A, polyimide, ethylene, propylene, α-methylstyrene, vinylcarbazole and polymerizable derivatives of these compounds.

(4) The nanodisk according to (2), wherein S1 is one block or two or more blocks composed of monomer units selected from the group consisting of styrene, isoprene, butadiene, bisphenol A, polyimide, ethylene, propylene, α-methylstyrene, vinylcarbazole and derivatives of these compounds, and themonomer unit constituting S2 is a block composed of a monomer unit selected from the group consisting of methyl methacrylate, methacrylic acid, acrylic acid, styrenesulfonic acid, N-isopropylacrylamide, acrylamide, vinylpyridine and derivatives of these compounds.

(5) An integrated body comprising 2 to 100 sheets of the nanodisk according to any one of (2) to (4) stacked on top of each other.

(6) A method for producing a nanodisk according to any one of (2) to (4), the method comprising the following processes a) to c):

a) preparing a polymer solution containing a block copolymer represented by the formula: S1-S2 (wherein S1 represents one block or a set of two or more blocks, and S2 represents a block different from S1) and a good solvent for the block copolymer, and adding to the polymer solution a poor solvent for the block copolymer which is compatible with the good solvent, to prepare a solution mixture;

b) removing the good solvent from the solution mixture to form fine particles having a lamellar structure formed from the block copolymer; and c) immersing the fine particles in a solvent capable of resolving the van der Waals force between S1 blocks that are adjacent to each other in the lamellar structure, to form a nanodisk.

(7) The nanodisk according to (1), having a structure represented by the following formula (II):

[Chemical Formula 2]

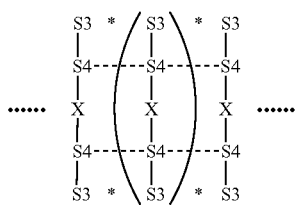
(II)

wherein ( ) represents a basic unit comprising two molecules of a block copolymer, S3-S4, arranged in series in the main chain direction; S3 represents one block or a set of two or more blocks; S4 represents a block formed from a monomer unit having an unsaturated bond; . . . represents a van der Waals bond between blocks; . . . indicates repetition;— represents a covalent bond; X represents $OsO_4$, $RuO_4$ or a crosslinked structure that can be formed by a bifunctional epoxy resin represented by the formula (III) and the unsaturated bond of the monomer unit constituting S2:

[Chemical Formula 3]

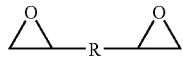
(III)

wherein R is a bisphenol A derivative or a polymer thereof;

* indicates that a van der Waals bond may be present at that position; the S4 block may have a monomer unit having a crosslinked structure and a monomer unit not having a crosslinked structure randomly present; and S4/(S3+S4) is 0.3 to 0.8.

(8) The nanodisk according to (7), wherein S3 is a block composed of a monomer unit selected from the group consisting of styrene, methyl methacrylate, butyl methacrylate, isobutylene, chlorostyrene, ε-caprolactone, D- and/or L-lactic acid, dimethylsiloxane, diacetyleneacetylene, and derivative of these compounds.

(9) The nanodisk according to (7), wherein S4 is a block composed of isoprene or butadiene.

(10) An integrated body comprising 2 to 100 sheets of the nanodisk according to any one of (7) to (9) stacked on top of each other.

(11) A method for producing the nanodisk according to any one of (7) to (9), the method comprising the following processes 1) to 4):

1) preparing a polymer solution containing a block copolymer represented by the formula: S3-S4 (wherein S3 represents one block or a set of two or more blocks, and S4 represents a block formed from a monomer unit having an unsaturated bond) and a good solvent for the block copolymer, and adding to the polymer solution a poor solvent for the block copolymer which is compatible with the good solvent, to prepare a solution mixture;

2) removing the good solvent from the solution mixture to form fine particles having a lamellar structure formed from the block copolymer;

3) adding $OsO_4$, $RuO_4$ or a bifunctional epoxy resin represented by the formula (III):

[Chemical Formula 4]

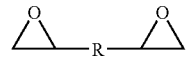
(III)

wherein R is a bisphenol A derivative or a polymer thereof, to the fine particles to form a crosslinked structure between S4 blocks; and 4) immersing the fine particles in a solvent capable of resolving the van der Waals force formed between the S3 blocks that are adjacent to each other in the lamellar structure, to form a nanodisk.

(12) The method for producing the nanodisk according to (11), wherein S3 is one block or a set of two or more blocks composed of monomer units selected from styrene, methyl methacrylate, butyl methacrylate, isobutylene, chlorostyrene, ε-caprolactone, D- and/or L-lactic acid, dimethylsiloxane, diacetyleneacetylene and derivatives of these compounds.

(13) The method for producing the nanodisk according to (11), wherein S4 is a block composed of isoprene or butadiene.

EFFECTS OF THE INVENTION

The nanodisk of the present invention has a thickness of 100 nm or less, and is transmissive to the light in the visible region. When a metal element is incorporated into the crosslinked structure part, the nanodisk can be used as a nanodisk having magnetic properties or electroconductivity, or as a nanodisk having a catalytic activity or a high refractive index.

Therefore, the polymer fine particles of the present invention are applicable to a wide variety of fields such as fine particulate powder technology, colloid surface science, electronic materials and optical materials.

BEST MODE FOR CARRYING OUT THE INVENTION

<Nanodisk>

The present invention provides a nanodisk comprising basic units aggregated in a planar direction, and having a thickness of 1 nm to 100 nm, a diameter of 10 nm to 5 μm, and an aspect ratio of 1 or greater, with the basic unit being formed of two molecules of a block copolymer arranged in series in the main chain direction.

The fundamental structure of the nanodisk of the present invention will be explained in the following by taking an example of a block copolymer A comprising any two blocks S1 and S2 as the simplest structure, and at the same time, a schematic diagram illustrating the fundamental structure will be shown in FIG. 1.

The nanodisk in this example has basic units formed of two molecules of a block copolymer A which are arranged in series in the main chain direction through a block S2 which is present at one end of the block copolymer. What is linking two molecules of the block copolymer A in series, is a van der Waals bond formed between the S2 blocks or a crosslinked structure formed between the S2 blocks. And, a number of this basic unit aggregate in a direction perpendicular to the main chain (identical to the planar direction of the finally formed nanodisk), and thus a disk is formed. What is aggregating the basic units in the perpendicular direction, is a van der Waals bond formed between the S2 block in one basic unit and the S2 block in another basic unit. Therefore, the length in the main chain direction of the two molecules of the block copolymer constituting the basic unit generally determines the thickness of the nanodisk, while the number of repetition of the basic unit aggregated in the perpendicular direction determines the size (diameter) of the nanodisk.

The nanodisk of the present invention in which the force linking two molecules of the block copolymer constituting the basic unit in the main chain direction in the structure of the nanodisk discussed in the above is a van der Waals bond, can be represented by the following formula (I):

[Chemical Formula 5]

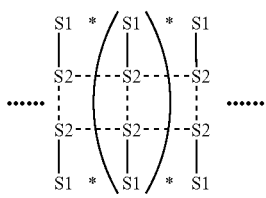

(I)

wherein ( ) is a basic unit formed of two molecules of a block copolymer, S1-S2, arranged in series in the main chain direction; . . . represents a van der Waals bond between blocks;— represents a covalent bond; . . . indicates repetition of the structure; and * indicates that a van der Waals bond may be present at that position.

Furthermore, S1 may be one block or a set of two or more blocks, while S2 is a block different from S1, with the difference between the solubility parameters of S1 and S2 being 2 or greater, and the ratio of S2 contained in the basic unit (S2/(S1+S2)) being 0.3 to 0.8.

Preferably, when the block S1 is one block or two or more different blocks composed of monomer units selected from the group consisting of methyl methacrylate, methacrylic acid, acrylic acid, styrenesulfonic acid, N-isopropylacrylamide, acrylamide, vinylpyridine and polymerizable derivatives of these compounds, as the block S2 which results in a difference in the solubility parameters of 2 or greater with S1, a block composed of a monomer unit selected from the group consisting of styrene, isoprene, butadiene, bisphenol A, polyimide, ethylene, propylene, α-methylstyrene, vinylcarbazole and polymerizable derivatives of these compounds may be used.

Furthermore, in the structure described above, the blocks constituting S1 and S2 may substitute each other. That is, one block or two or more different blocks composed of monomer units selected from the group consisting of styrene, isoprene, butadiene, bisphenol A, polyimide, ethylene, propylene, α-methylstyrene, vinylcarbazole and derivatives of these compounds, may be taken as the block S1. In this case, the block S2 can be a block composed of a monomer unit selected from the group consisting of methyl methacrylate, methacrylic acid, acrylic acid, styrenesulfonic acid, N-isopropylacrylamide, acrylamide, vinylpyridine and derivatives of these compounds.

The nanodisk of the present invention in which the force linking the two molecules of the block copolymer constituting the basic unit in the main chain direction is a crosslinked structure, can be represented by the following formula (II):

[Chemical Formula 6]

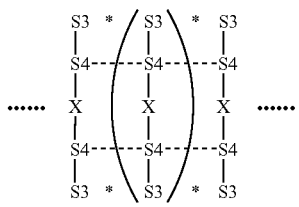

(II)

wherein ( ) represents a basic unit formed of two molecules of a block copolymer, S3-S4, arranged in series in the main chain direction; . . . represents a van der Waals bond between blocks;— represents a covalent bond; . . . indicates repetition of the structure; and * indicates that a van der Waals bond may be present at that position.

The block S3 may be one block or a set of two or more blocks, while the block S4 is a block formed of a monomer unit having an unsaturated bond, and the ratio S4/(S3+S4) is 0.3 to 0.8.

Preferably, the block S3 is one block or two or more blocks composed of monomer units selected from the group consisting of styrene, methyl methacrylate, butyl methacrylate, isobutylene, chlorostyrene, ε-caprolactone, D- and/or L-lactic acid, dimethylsiloxane, diacetyleneacetylene and derivatives of these compounds. The block S4 is a block composed of isoprene or butadiene.

X represents a crosslinked structure which can be formed by $OsO_4$, $RuO_4$ or a bifunctional epoxy resin represented by the formula (III):

[Chemical Formula 7]

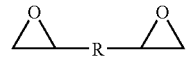

(III)

and the unsaturated bond of the monomer unit constituting the block S4. Here, R is a bisphenol A derivative or a polymer thereof. The crosslinked structure formed by a reaction between $OsO_4$ or $RuO_4$ and the unsaturated bond can be represented by the following formulas.

[Chemical Formula 8]

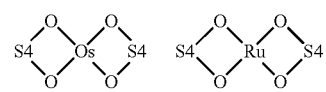

Furthermore, the crosslinked structure formed by a reaction between a bifunctional epoxy resin represented by the formula (III):

[Chemical Formula 9]

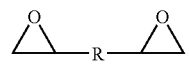

(III)

and an unsaturated bond, can be represented by the following formula:

[Chemical Formula 10]

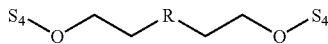

In addition, the block S4 may have a monomer unit having a crosslinked structure X and a monomer unit not having a crosslinked structure X present randomly.

The block copolymer constituting the above-described basic unit, S1-S2 or S3-S4, can be synthesized according to a general method for copolymer production, by selecting a monomer from the above compounds. Some examples of the copolymer, for example, block copolymers in which S1 is vinylpyridine and S2 is styrene, or block copolymers in which S3 is styrene or S4 is isoprene, are commercially available from Polymer Source, Inc. of the United States, and in the present invention, these commercially available block copolymers can also be used.

The nanodisk of the present invention can also form an integrated body when 2 to 100 sheets of the nanodisk are stacked up, and this integrated body is provided as the present invention. A schematic diagram of the integrated body is shown in FIG. 4.

<Method for Producing Nanodisk>

The present invention also provides a method for producing the nanodisk described in the above.

The method for producing the nanodisk in which the force linking the two molecules of the block copolymer constituting the basic unit of the nanodisk of the present invention in the main chain direction is van der Waals force, comprises the following processes a) to c):

a) preparing a polymer solution containing a block copolymer represented by the formula: S1-S2 (wherein S1 and S2 have the same meaning as described in regard to the structure of the nanodisk) and a good solvent for the block copolymer, and adding a poor solvent for the block copolymer which is compatible with the good solvent, to prepare a solution mixture;

b) removing the good solvent from the solution mixture to form fine particles having a lamellar structure formed from the block copolymer; and c) immersing the fine particles in a solvent capable of resolving the van der Waals force between S1 blocks that are adjacent to each other in the lamellar layer, to form a nanodisk.

Furthermore, a method for producing the nanodisk in which the force linking the two molecules of the block copolymer constituting the basic unit of the nanodisk of the present invention in the main chain direction is a crosslinked structure, comprises the following processes 1) to 4).

1) preparing a polymer solution containing a block copolymer represented by the formula: S3-S4 (wherein S3 and S4 have the same meaning as described in regard to the structure of the nanodisk) and a good solvent for the block copolymer, and adding a poor solvent for the block copolymer which is compatible with the good solvent, to prepare a solution mixture;

2) removing the good solvent from the solution mixture to form fine particles having a lamellar structure formed from the block copolymer.

3) adding $OsO_4$, $RuO_4$ or a bifunctional epoxy resin represented by formula (III):

[Chemical Formula 11]

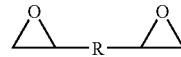

(III)

wherein R is a bisphenol A derivative or a polymer thereof, to the fine particles to form a crosslinked structure between the S4 blocks; and 4) immersing the fine particles in a solvent capable of resolving the van der Waals force generated between S3 blocks that are adjacent to each other in the lamellar layer, to form a nanodisk.

The fine particles formed by the processes a) and b) as well as 1) and 2) are polymer fine particles which are composed of the block copolymer S1-S2 or S3-S4 (wherein S1 to S4 have the same meaning as previously described, and will be the same hereinafter), and have a lamellar structure at the surface part (hereinafter, referred to as lamellar fine particles).

The polymer fine particles comprising a block copolymer, which provide the basis of lamellar fine particles and the processes a) and b) as well as 1) and 2), and the method for producing the same have been filed for patent as Japanese Patent Application No. 2004-260844 (polymer fine particles and method for producing the same). This method is a method for forming polymer fine particles by providing a polymer solution containing a block copolymer and a solvent having high solubility for this copolymer (good solvent), adding a solvent which is compatible with such good solvent but has low solubility for the block copolymer (poor solvent), to the polymer solution to prepare a liquid mixture of the two solvents, and then removing the good solvent selectively from the liquid mixture through evaporation or the like.

The polymer fine particles formed by the method described in Japanese Patent Application No. 2004-260844 have a particle size of typically 100 μm or less, and preferably 10 nm to 10 μm. Further, the fine particles have, at the surface part, a lamellar structure formed on the basis of the difference in the properties or on the basis of repulsive force between blocks of the block copolymer, to be more specific, the repulsive force between the respective blocks. That is, the respective layers constituting this lamellar structure are formed by the blocks constituting the block copolymer gathered together. A schematic diagram of an example of this lamellar fine particle is shown in FIG. 2.

In the method for producing the nanodisk of the present invention, the processes a) and b) as well as 1) and 2) correspond to the use of block copolymers S1-S2 and S3-S4 having the previously mentioned features in the method described in Japanese Patent Application No. 2004-260844. The good solvent and poor solvent for the block copolymer may be appropriately selected and combined while taking the type of the block copolymer used and the compatibility of the two solvents into consideration. In that case, it is preferable to use, as the good solvent, a solvent having appropriate polarity and a boiling point lower than that of the poor solvent, and to use, as the poor solvent, a solvent having high polarity.

For example, as the good solvent for a block copolymer in which one of the blocks of S1-S2 is an aromatic hydrocarbon-based block, and the other is an aliphatic hydrocarbon-based block, there may be mentioned tetrahydrofuran, acetone, dioxane, acetonitrile, ethanol and the like. In the case of S3-S4, there may be mentioned tetrahydrofuran, acetone, dioxane, dimethylsulfoxide, dimethylformamide and the like as the good solvent.

The concentration of the block copolymer in the polymer solution is not particularly limited as long as S1-S2 and S3-S4 are all at the saturated concentration or below, but the concentration is preferably from the saturated concentration to about 1/100 of the saturated concentration.

Specific examples of the poor solvent that can be used in combination of such good solvent include water or a lower alcohol such as ethanol or butanol, as the poor solvent for a block copolymer in which one of the blocks of S1-S2 is an aromatic hydrocarbon-based block, and the other is an aliphatic hydrocarbon-based block. In the case of S3-S4, too, water or a lower alcohol such as ethanol or butanol may be mentioned as the poor solvent.

The amount of the poor solvent to be added into the polymer solution is appropriately selected while taking the type of the block copolymer, the type of the good solvent, the particle size of the fine particles to be produced, and the like into consideration, but in general, the poor solvent may be added in an amount of 0.5- to 10-fold the amount of the polymer solution. By adding the poor solvent, a liquid mixture is prepared. In other words, the temperature at which the operation of diluting the polymer solution by adding the poor solution is not particularly limited, and for example, the operation can be performed at any temperature in the range of 0 to 90° C., and preferably at room temperature. The rate of addition of the poor solvent into the polymer solution is not particularly limited.

After the addition of the poor solvent, the good solvent is removed, preferably evaporated, to lower the solubility of the block copolymer, and thus lamellar fine particles are precipitated. As shown in FIG. 2, these lamellar fine particles have a microstructure in which layers formed of the S1 block and layers formed of the S2 block are stacked on top of each other in an alternating manner.

The particle size of the lamellar fine particles produced by the processes a) and b) as well as 1) and 2), can be controlled by adjusting the concentration of the block copolymer in the polymer solution dissolved in the good solvent, and the amount of the poor solvent added (ratio with respect to the amount of the good solvent). In general, if the concentration of the block copolymer in the polymer solution is high, the particle size of the fine particles is increased, and if the concentration is low, the particle size of the fine particles is decreased. If the amount of the poor solvent added (ratio with respect to the amount of the good solvent) is increased, the particle size of the fine particles is decreased, and if the amount of the poor solvent added (ratio with respect to the amount of the good solvent) is decreased, the particle size of the fine particles is increased. When solvents which are highly miscible to each other are selected as the good solvent and the poor solvent, and dilution of the polymer solution through the addition of the poor solvent is performed uniformly in a short time, fine particles having a narrower particle size distribution can be produced.

The process 3) which is required in the case where the force linking the two molecules of the block copolymer constituting the basic unit of the nanodisk in the main chain direction is a crosslinked structure, is a process of adding $OsO_4$, $RuO_4$ or a bifunctional epoxy resin represented by the formula (III):

[Chemical Formula 12]

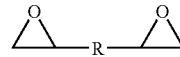

(III)

wherein R is a bisphenol A derivative or a polymer thereof, to the lamellar fine particles formed in the processes 1) and 2), to form a crosslinked structure represented by the following formula between the S4 blocks.

[Chemical Formula 13]

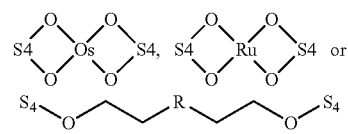

Through this reaction process, the unsaturated bonds in the block copolymer constituting the lamellar fine particles are crosslinked to each other, so that two molecules of the block copolymer constituting the basic unit can be linked by covalent bonding.

In addition, not all of the unsaturated bonds of the S4 block need to be crosslinked by the crosslinking agent, and in the S4 block, monomer units having a crosslinked structure formed and monomer units not having a crosslinked structure formed may be present randomly. The disposition or order of the monomer units having a crosslinked structure formed and the monomer units not having a crosslinked structure formed is also not limited. Therefore, the monomer units having a crosslinked structure formed and the monomer units not having a crosslinked structure formed inside the S4 block may be present randomly.

The amount of addition of $OsO_4$, $RuO_4$ or the bifunctional epoxy resin represented by the formula (III):

[Chemical Formula 14]

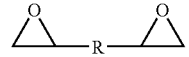

(III)

may be about equal or excessive in molar ratio, with respect to the unsaturated bond present in the lamellar fine particles formed by the processes 1) and 2). In the reaction for forming the crosslinked structure, a curing agent such as methyl-5-norbornene-2,3-dicarboxylic acid anhydride, dodecenylsuccinic anhydride or an iodonium cation-based curing agent may be added in an amount of about 0.1% to 10% relative to the crosslinking agent. The treatment temperature, time or the like for the crosslinking reaction of the process 3) is not particularly limited, but preferably, the temperature may be set in the range of 20° C. to 100° C., and the time may be set in the range of 0.05 hours to 10 hours.

The processes c) and 4) according to the methods of the present invention are processes of immersing the lamellar fine particles that have been produced in the processes a) and b) or processes 1) to 3), and are dispersed in a poor solvent, or the lamellar fine particles that have been recovered from the poor solvent by a centrifugal operation or the like, and have dispersed in an appropriate solvent, in a solvent capable of resolving the van der Waals force between the S1 blocks or S3 blocks that are adjacent to each other in the lamellar layer, to thus form a nanodisk. The lamellar layer in the lamellar fine particles undergo resolution of the van der Waals bond formed between the S1 blocks or between the S3 blocks when the lamellar fine particles are placed in the above-described solvent, and thus the layer formed from the S1 block or the S3 block is separated from the middle. As a result, the nanodisk of the present invention previously discussed is formed from the lamellar fine particles. A schematic diagram illustrating the course of formation of the nanodisk of the present invention from lamellar fine particles is shown in FIG. 3.

As the solvent which can resolve the van der Waals force between the S1 blocks used in the process c), the good solvent used in the process a) may be used. For example, in the case where the S1 block is a block of an aromatic hydrocarbon such as styrene, tetrahydrofuran, dioxane, dimethyl sulfoxide, dimethylformamide and the like may be mentioned. In particular, it is preferable to use tetrahydrofuran. Furthermore, in the case where the S1 block is a block of an aliphatic hydrocarbon, tetrahydrofuran, acetone, dioxane and the like may be mentioned.

As the solvent which can resolve the van der Waals force between the S3 blocks used in the process 4), the good solvent used in the process 1), for example, tetrahydrofuran, chloroform and the like may be used.

Furthermore, while the lamellar fine particles are immersed in the solvent used in the process c) or 4), the solvent may be subjected to ultrasonication or heat treatment. By applying these operations, the generation of nanodisks from the lamellar fine particles may be promoted.

Hereinafter, specific embodiments of the present invention will be described in more detail by way of Examples, but the present invention is not intended to be limited to the following Examples as long as the scope does not go beyond the gist.

EXAMPLE 1

<Production of Nanodisk>

Process a): Poly(styrene-block-isoprene) represented by the following formula was dissolved in tetrahydrofuran (THF, containing a stabilizer, EP grade manufactured by Wako Pure Chemical Industries, Ltd.) to prepare a polymer solution at a concentration of 0.20 mg/mL.

[Chemical Formula 15]

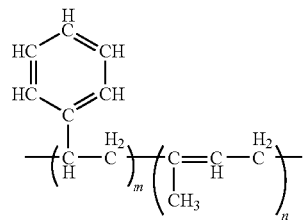

m:n = 171:176

To 1 mL of this polymer solution, 2 mL of pure water was added to obtain a solution mixture.

Process b): This solution mixture was allowed to stand still at ambient pressure and at 25° C., and THF was evaporated to form lamellar fine particles. The particle size of the formed fine particles was measured by dynamic light scattering, and the particle size was found to be 450 nm.

Figure 1:
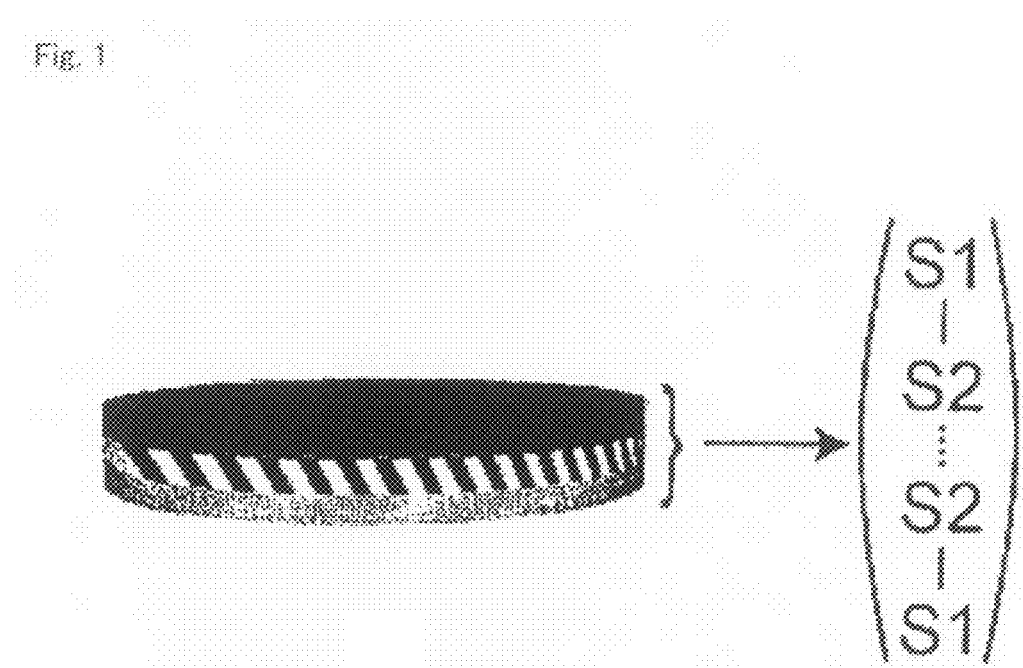
FIG. 1 is a diagram schematically illustrating the nanodisk of the present invention.
Figure 2:
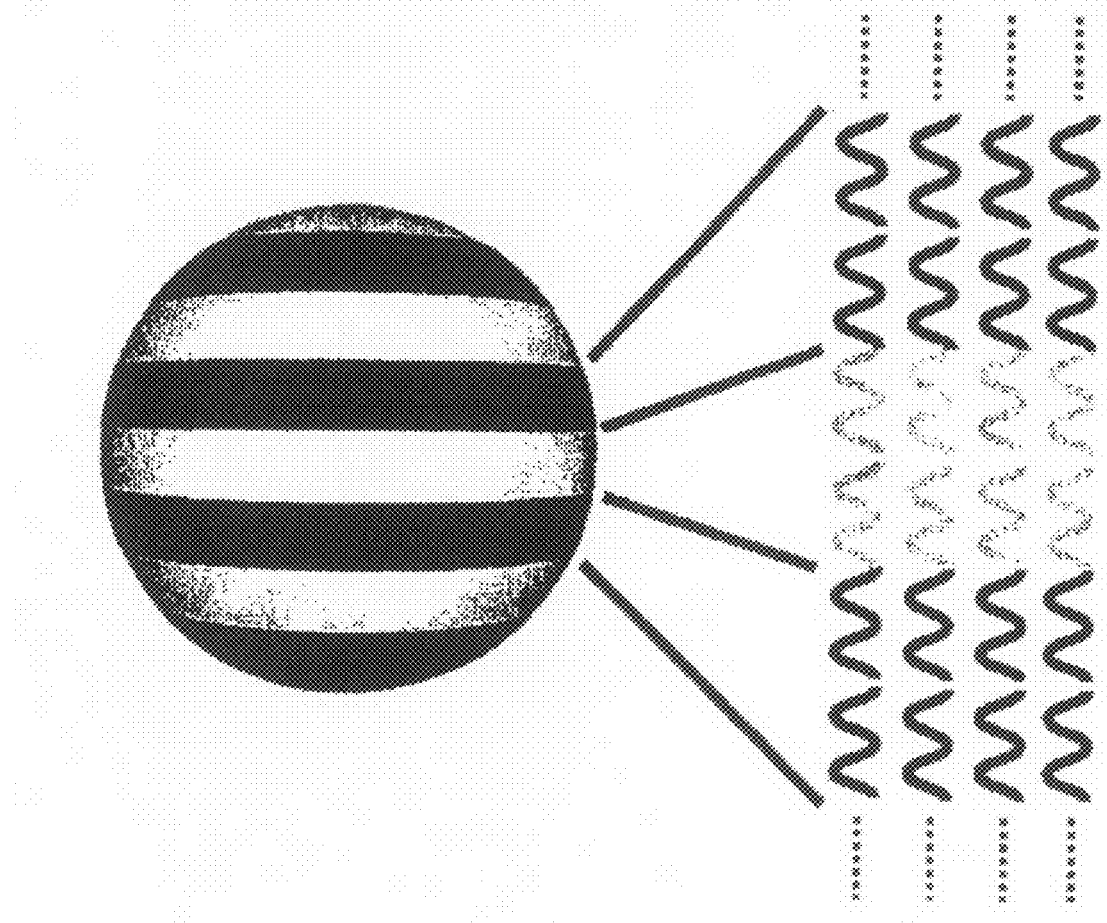
FIG. 2 is a diagram schematically illustrating the structure of a lamellar fine particle formed according to the production method of the present invention.
Figure 3:
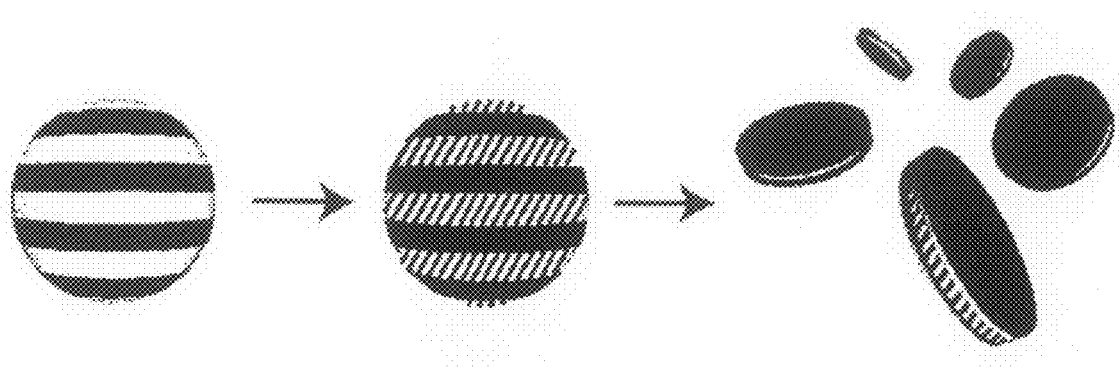
FIG. 3 is a diagram schematically illustrating the course of the formation of nanodisk from lamellar fine particles according to the production method of the present invention.
Figure 4:
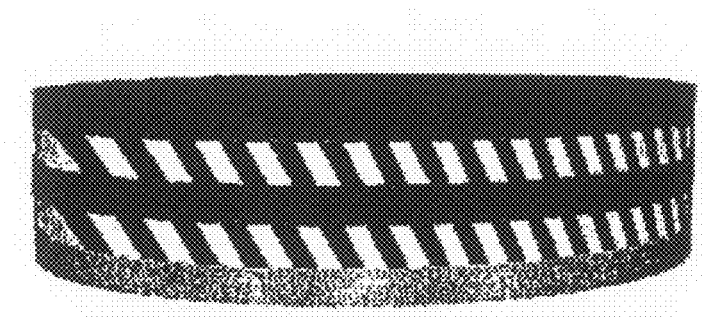
FIG. 4 is a diagram schematically illustrating an integrated body of the nanodisks of the present invention.
Figure 5:
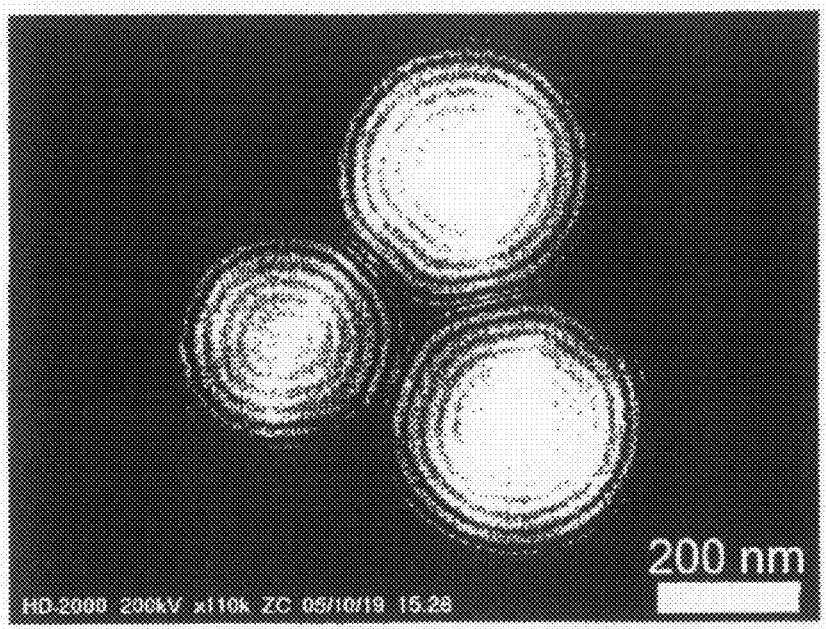
FIG. 5 shows a scanning transmission electron micrograph of lamellar fine particles having a crosslinked structure formed according to the production method of the present invention.

Process c): To 0.2 mg of the lamellar fine particles in pure water, 4.0 mg of osmium tetraoxide was added, and the mixture was allowed to react at 20° C. for 120 minutes. The fine particles after the reaction were observed under a scanning transmission electron microscope (STEM, FIG. 5). It was confirmed that a lamellar-like phase-separated structure was formed in the interior of the fine particles.

Figure 6:
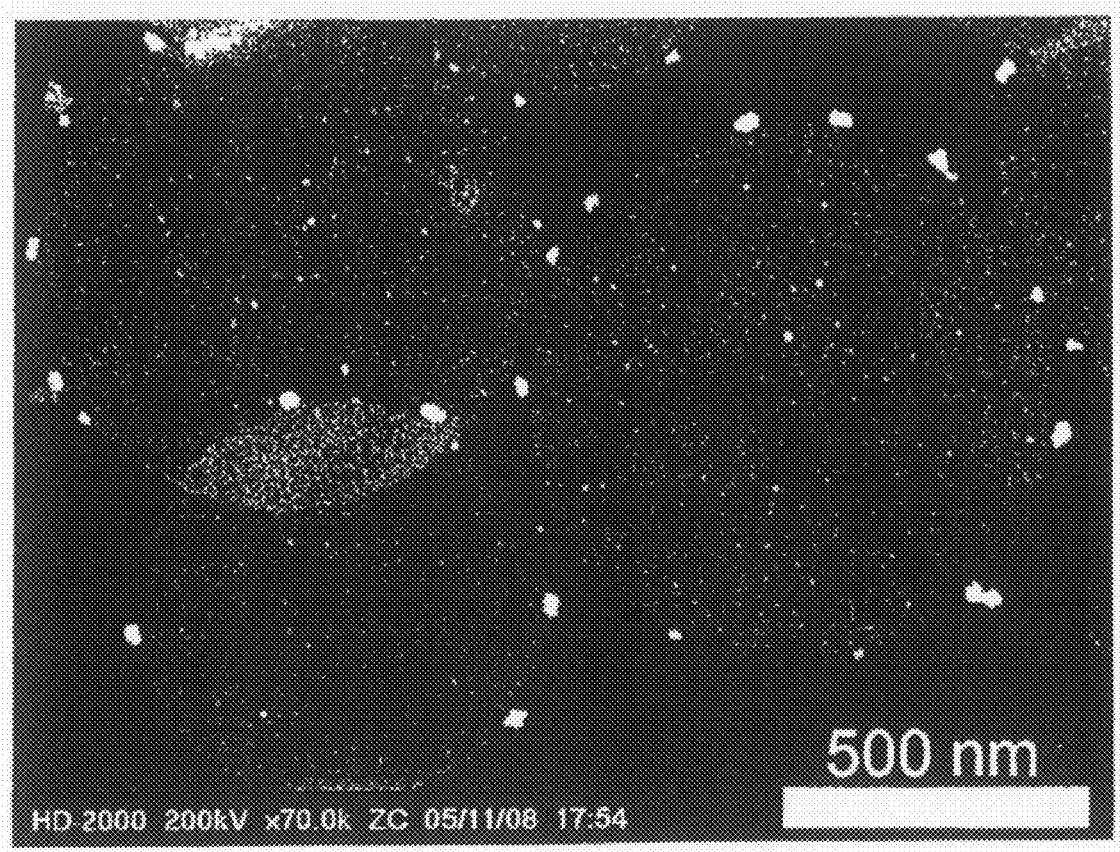
FIG. 6 shows a scanning transmission electron micrograph of the nanodisks of the present invention.

Process d): The fine particles were recovered by centrifugation (5° C., 13000 rpm, 15 minutes), subsequently 2 mL of THF was added thereto, and the mixture was ultrasonicated (UD-200 manufactured by Tomy Seiko Co., Ltd., output power 50 to 100 W, for 20 minutes). Subsequently, the fine particles were observed by STEM, and a nanodisk-shaped block copolymer (nanodisk) having a thickness of about 21 nm and a diameter of 300 to 500 nm was obtained (FIG. 6).

EXAMPLE 2

Process a): A block copolymer formed of polystyrene and polyisoprene (Poly(styrene-b-isoprene), Mn (PSt): 141,500, Mn (PI): 80,600, Mw/Mn: 1.07) was dissolved in THF, to prepare a polymer solution at a concentration of 0.1 mg/mL. To 1 mL of this polymer solution, 2 mL of pure water was added to obtain a solution mixture.

Process b): This solution mixture was allowed to stand still at ambient pressure and at 10° C., and THF was evaporated to form lamellar fine particles.

Figure 7:
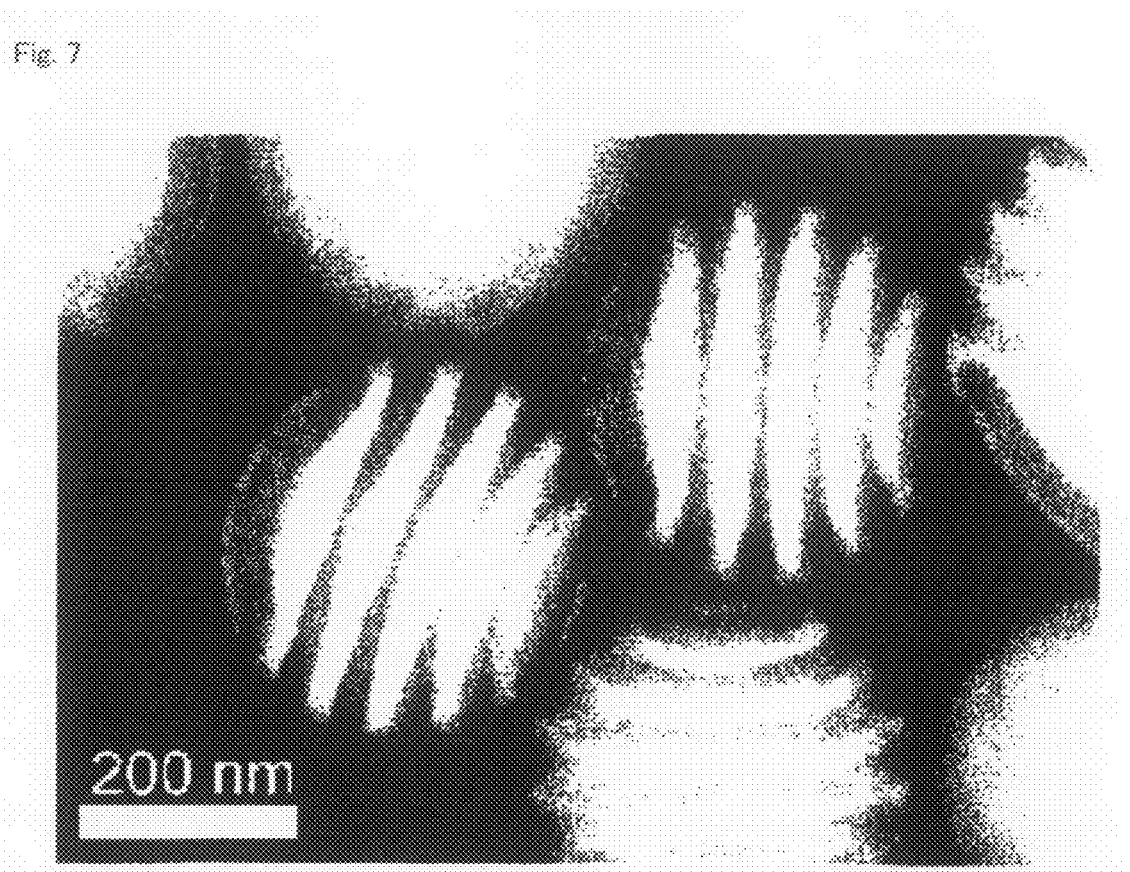
FIG. 7 shows a scanning transmission electron micrograph of lamellar fine particles having a crosslinked structure formed according to the production method of the present invention.

Process c): To 0.2 mg of the lamellar fine particles in pure water, 4.0 mg of osmium tetraoxide was added, and the mixture was allowed to react at 20° C. for 120 minutes, to crosslink and stain the double bond sites of polyisoprene. The fine particles after the reaction were observed under a scanning transmission electron microscope (STEM, FIG. 7). It was confirmed that a lamellar-like phase-separated structure with a pitch of 55 nm was formed in the interior of the fine particles.

Figure 8:
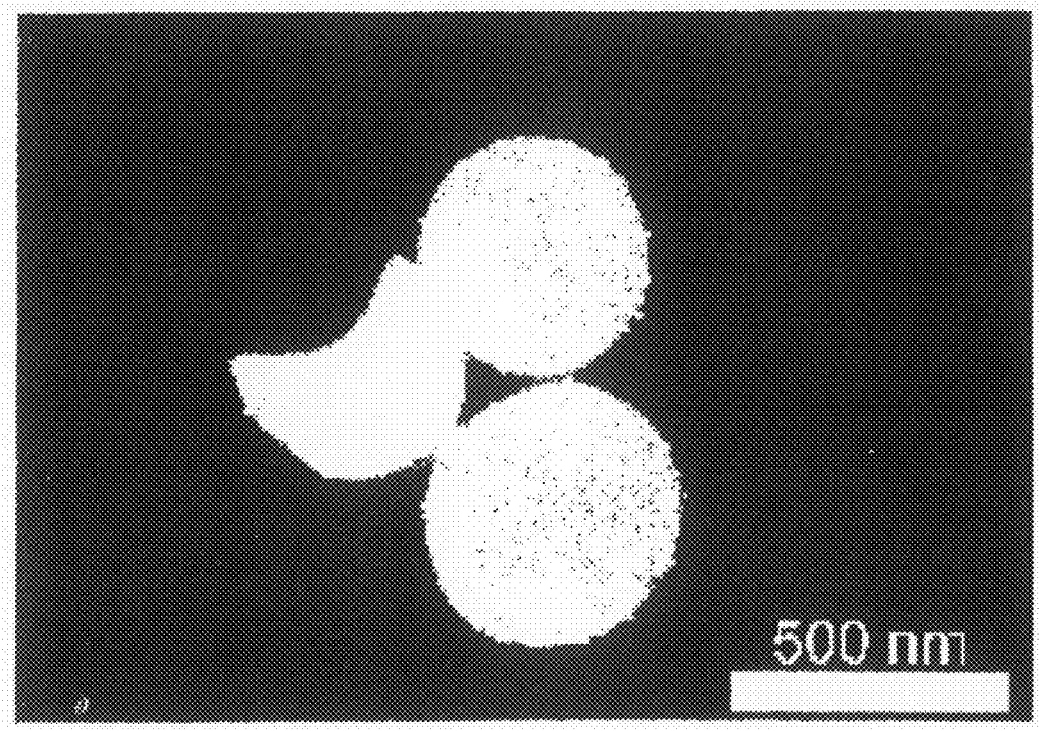
FIG. 8 shows a scanning transmission electron micrograph of the nanodisks of the present invention.

Process d): The fine particles were precipitated by centrifugation (5° C., 12,000 rpm, 15 minutes) to remove water, subsequently THF was added thereto, and the mixture was ultrasonicated (UD-200 manufactured by Tomy Seiko Co., Ltd., output power 50 to 100 W, for 20 minutes). Subsequently, the fine particles were observed again by STEM, and a nanodisk-shaped block copolymer (nanodisk) having a thickness of about 54 nm and a diameter of 300 to 500 nm was obtained (FIG. 8).

EXAMPLE 3

A block copolymer formed of polystyrene and polyisoprene (Poly(styrene-b-isoprene), Mn (PSt): 17,800, Mn (PI): 12,000, Mw/Mn: 1.02) was dissolved in THF, to prepare a polymer solution at a concentration of 0.1 mg/mL. To 1 mL of this polymer solution, 2 mL of pure water was added to obtain a solution mixture. This solution mixture was allowed to stand still at ambient pressure and at 25° C., and THF was evaporated to form a fine particle dispersion containing lamellar fine particles. The fine particle dispersion was diluted by adding water to a total volume of 3 ml, and the transmittance of this fine particle dispersion in the visible light region of 400 to 700 nm was measured.

Thereafter, osmium tetraoxide was added to the whole fine particle solution, and the mixture was allowed to react at 20° C. for 120 minutes, to crosslink and stain the double bond sites of polyisoprene. The fine particles after the reaction were precipitated by centrifugation (5° C., 12,000 rpm, 15 minutes), and the precipitate was washed two times with pure water to remove excess osmium tetraoxide. Then, the fine particle dispersion was prepared to a total volume of 3 mL, and transmittance measurement was performed in the same manner.

Furthermore, the fine particles were reprecipitated by centrifugation (5° C., 12,000 rpm, 15 minutes) to remove water, subsequently THF was added thereto, and the mixture was ultrasonicated (UD-200 manufactured by Tomy Seiko Co., Ltd., output power 50 to 100 W) for 4 hours. Subsequently, this THF solution was prepared to a total volume of 3 ml, and transmittance measurement was performed in the same manner.

Figure 9:
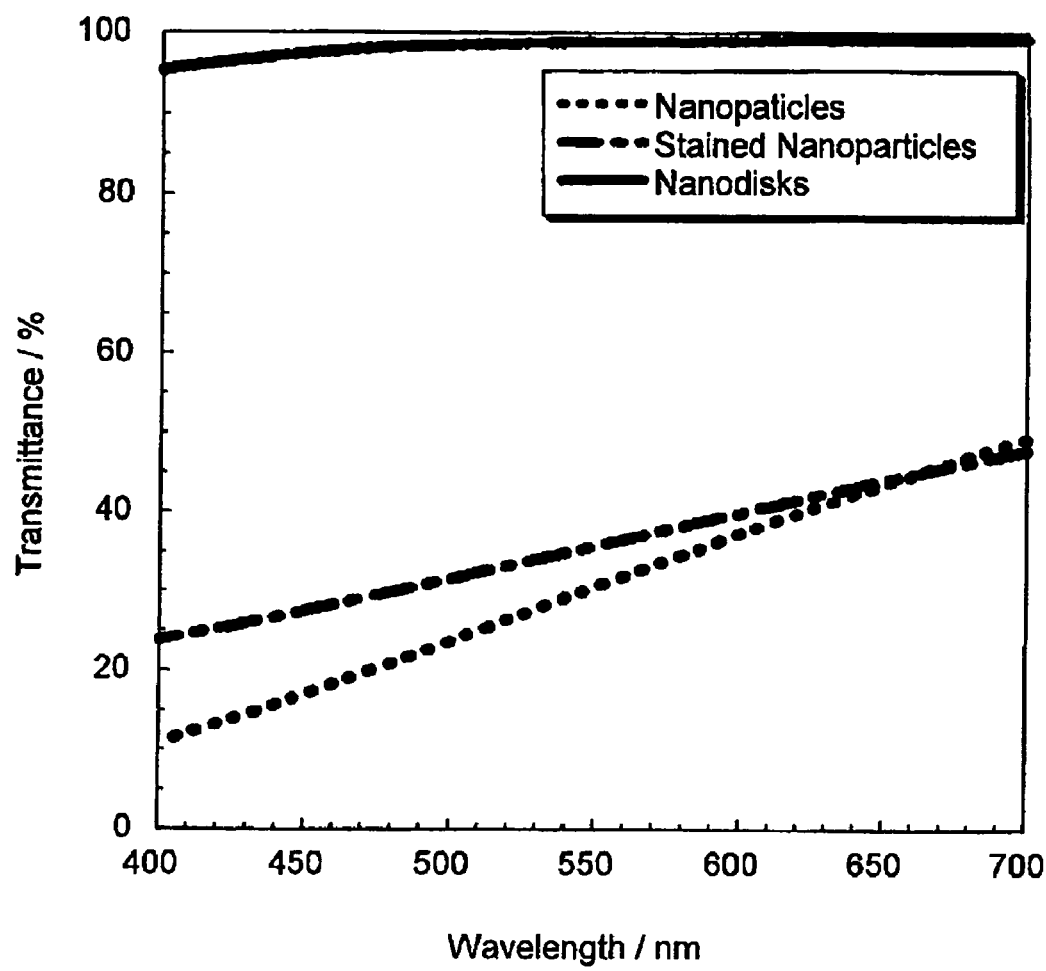
FIG. 9 shows the results of measuring the transmittance of the lamellar fine particles having a crosslinked structure formed according to the production method of the present invention, and of the nanodisks. The vertical axis represents transmittance, while the lateral axis represents wavelength.

As a result, it was confirmed that the transmittance of the lamellar fine particles was about 25% to 50%, while the transmittance of the nanodisk of the present invention was 95% or greater (FIG. 9).

The invention claimed is:

1. A nanodisk comprising basic units aggregated in a planar direction, and having a thickness of 1 nm to 100 nm, a diameter of 10 nm to 5 μm and an aspect ratio of 1 or greater, with the basic unit being formed of two molecules of a block copolymer arranged in series in a main chain direction of the copolymer, and having a structure represented by the following formula (I):

[Chemical Formula 1]

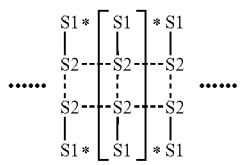

(I)

wherein ( ) represents a basic unit comprising two molecules of a block copolymer, S1-S2, arranged in series in the main chain direction; S1 represents one block or a set of two or more blocks; S2 represents a block different from S1; . . . represents a van der Waals bond between blocks;—represents a covalent bond; . . . indicates repetition; * indicates that a van der Waals bond may be present at that position; the difference between solubility parameters of S1 and S2 is 2 or greater; and S2/(S1+S2) is 0.3 to 0.8.

2. The nanodisk according to claim 1, wherein S1 is one block or two or more blocks composed of monomer units selected from the group consisting of methyl methacrylate, methacrylic acid, acrylic acid, styrenesulfonic acid, N-isopropylacrylamide, acrylamide, vinylpyridine and polymerizable derivatives of these compounds, and S2 is a block composed of a monomer unit selected from the group consisting of styrene, isoprene, butadiene, bisphenol A, polyimide, ethylene, propylene, α-methylstyrene, vinylcarbazole and polymerizable derivatives of these compounds.

3. The nanodisk according to claim 2, wherein S1 is one block or two or more blocks composed of monomer units selected from the group consisting of styrene, isoprene, butadiene, bisphenol A, polyimide, ethylene, propylene, α-methylstyrene, vinylcarbazole and derivatives of these compounds, and S2 is a block composed of a monomer unit selected from the group consisting of methyl methacrylate, methacrylic acid, acrylic acid, styrenesulfonic acid, N-isopropylacrylamide, acrylamide, vinylpyridine and derivatives of these compounds.

4. A method for producing the nanodisk according to claim 1, the method comprising:
   a) preparing a polymer solution containing a block copolymer represented by the formula: S1-S2 (wherein S1 represents one block or a set of two or more blocks, and S2 represents a block different from S1) and a good solvent for the block copolymer, and adding to the polymer solution a poor solvent for the block copolymer which is compatible with the good solvent, to prepare a solution mixture;
   b) removing the good solvent from the solution mixture to form fine particles having a lamellar structure formed from the block copolymer; and
   c) immersing the fine particles in a solvent capable of resolving the van der Waals force between S1 blocks that are adjacent to each other in the lamellar structure, to form the nanodisk.

5. A nanodisk comprising basic units aggregated in a planar direction, and having a thickness of 1 nm to 100 nm, a diameter of 10 nm to 5 μm and an aspect ratio of 1 or greater, with the basic unit being formed of two molecules of a block copolymer arranged in series in a main chain direction of the copolymer, and having a structure represented by the following formula (II):

[Chemical Formula 2]

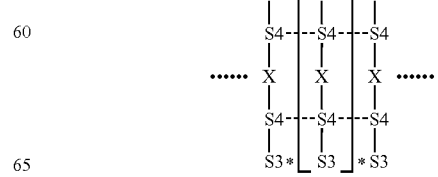

(II)

wherein ( ) represents a basic unit comprising two molecules of a block copolymer, S3-S4, arranged in series in the main chain direction; S3 represents one block or a set of two or more blocks; S4 represents a block formed from a monomer unit having an unsaturated bond; . . . represents a van der Waals bond between blocks; . . . indicates repetition;—represents a covalent bond; X represents a crosslinked structure that can be formed by $OsO_4$, $RuO_4$ or a bifunctional epoxy resin represented by the formula (III), and the unsaturated bond of the monomer unit constituting S2:

[Chemical Formula 4]

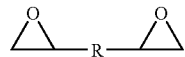

(III)

wherein R is a bisphenol A derivative or a polymer thereof; * indicates that a van der Waals bond may be present at that position; the S4 block may have a monomer unit having a crosslinked structure and a monomer unit not having a crosslinked structure randomly present; and S4/(S3+S4) is 0.3 to 0.8.

6. The nanodisk according to claim 5, wherein S3 is a block composed of a monomer unit selected from the group consisting of styrene, methyl methacrylate, butyl methacrylate, isobutylene, chlorostyrene, ε-caprolactone, D-and/or L-lactic acid, dimethylsiloxane, diacetyleneacetylene, and derivative of these compounds.

7. The nanodisk according to claim 5, wherein S4 is a block composed of isoprene or butadiene.

8. A method for producing the nanodisk according to claim 5, the method comprising the following processes 1) to 4):
1) preparing a polymer solution containing a block copolymer represented by the formula: S3-S4 (wherein S3 represents one block or a set of two or more blocks, and S4 represents a block formed from a monomer unit having an unsaturated bond) and a good solvent for the block copolymer, and adding to the polymer solution a poor solvent for the block copolymer which is compatible with the good solvent, to prepare a solution mixture;
2) removing the good solvent from the solution mixture to form fine particles having a lamellar structure formed from the block copolymer;
3) adding $OsO_4$, $RuO_4$ or a bifunctional epoxy resin represented by the formula (III):

[Chemical Formula 3]

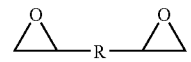

(III)

wherein R is a bisphenol A derivative or a polymer thereof,
to the fine particles to form a crosslinked structure between S4 blocks; and
4) immersing the fine particles in a solvent capable of resolving the van der Waals force formed between the S3 blocks that are adjacent to each other in the lamellar structure, to form a nanodisk.

9. The method for producing the nanodisk according to claim 8, wherein S3 is one block or a set of two or more blocks composed of monomer units selected from the group consisting of styrene, methyl methacrylate, butyl methacrylate, isobutylene, chlorostyrene, ε-caprolactone, D- and/or L-lactic acid, dimethylsiloxane, diacetyleneacetylene and derivatives of these compounds.

10. The method for producing the nanodisk according to claim 8, wherein S4 is a block composed of isoprene or butadiene.

* * * * *